United States Patent

Shimizu

[11] Patent Number: 4,890,996
[45] Date of Patent: Jan. 2, 1990

[54] CONTINUOUS GRANULATING MACHINE

[75] Inventor: Nobuaki Shimizu, Hiroshima, Japan

[73] Assignee: The Japan Steel Works, Ltd., Tokyo, Japan

[21] Appl. No.: 442,810

[22] Filed: Nov. 18, 1982

[30] Foreign Application Priority Data

Nov. 18, 1981 [JP] Japan ................................ 56-183863

[51] Int. Cl.⁴ .................................................. B29B 7/48
[52] U.S. Cl. ........................................ 425/145; 366/83; 366/89; 425/149; 425/202; 425/204; 425/205; 425/208; 425/311; 264/40.1; 264/40.7; 264/211.23; 264/142
[58] Field of Search ............... 264/142, 176 R, 349, 264/200-205, 40.3, 40.1, 40.7, 211.23; 425/311, 313, 204-207, 376 R, 145, 149, 185, 190, 208; 366/78, 79, 83, 85, 89, 88

[56] References Cited

U.S. PATENT DOCUMENTS

| | | | |
|---|---|---|---|
| 2,258,288 | 10/1941 | Heft et al. | 425/376 R |
| 2,515,201 | 7/1950 | Dulmage et al. | 425/376 A |
| 3,070,836 | 1/1963 | De Haven et al. | 425/204 |
| 3,090,992 | 5/1963 | Schlachter et al. | 425/376 R |
| 3,304,062 | 2/1967 | Frechtling | 425/204 |
| 3,376,603 | 4/1968 | Colombo | 425/204 |
| 3,499,186 | 7/1970 | Sassa | 425/204 |
| 3,518,721 | 3/1967 | Rukas et al. | 425/208 |
| 3,525,124 | 8/1970 | Ocker | 425/204 |
| 3,642,406 | 2/1972 | Irving | 425/198 |
| 3,649,147 | 3/1972 | Fritsch | 425/376 A |
| 3,689,184 | 9/1972 | Morse | 425/376 R |
| 3,802,670 | 4/1974 | Okada et al. | 425/208 |
| 3,876,188 | 4/1975 | Koch et al. | 425/208 |
| 3,991,153 | 11/1976 | Klausner et al. | 264/349 |
| 4,092,089 | 5/1978 | Booker et al. | 425/376 A |
| 4,137,023 | 1/1979 | Moked et al. | 425/376 A |
| 4,171,193 | 10/1979 | Rahlfu | 425/376 A |
| 4,336,213 | 6/1982 | Fox | 425/376 B |
| 4,354,814 | 10/1982 | Grimminger et al. | 425/190 |
| 4,452,750 | 6/1984 | Handwerk et al. | 264/40.3 |

Primary Examiner—Jan H. Silbaugh
Assistant Examiner—Jill L. Heitbrink
Attorney, Agent, or Firm—Sughrue, Mion, Zinn, Macpeak & Seas

[57] ABSTRACT

A continuous granulator of the double-screw type includes a mechanism by which the degree of kneading can be controlled, and prevents lateral communication between the screw ends. A gear pump connected after the screw cylinders delivers the material to the cutting unit.

10 Claims, 2 Drawing Sheets

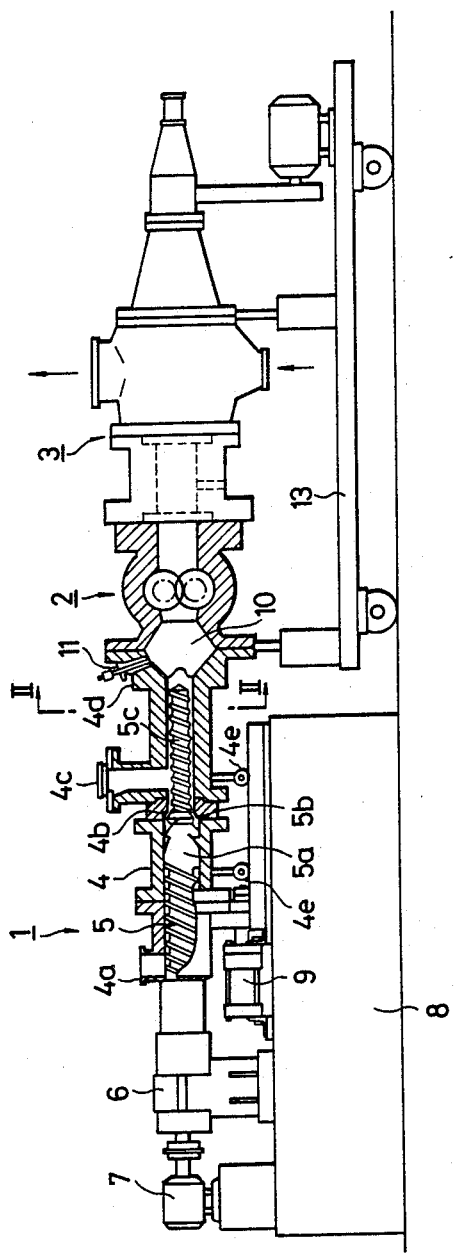
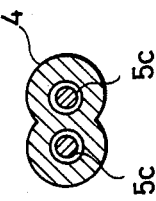
FIG. 1
FIG. 2

CONTINUOUS GRANULATING MACHINE

BACKGROUND OF THE INVENTION

The present invention relates to a continuous granulating machine for continuously melting, kneading and granulating macromolecular materials.

One known apparatus for melting, kneading and granulating a resin material is composed of a kneader with both screw ends supported for melting and kneading the resin material, and a single-screw extruder for granulating the resin material. This apparatus in the form of a kneader/extruder combination is relatively large in overall size, consumes an increased amount of energy, and allows the resin material to be subjected to a high heat history.

Another prior apparatus comprises a kneader having only one supported screw end and a granulating machine connected in series with a front end of the kneader for simultaneously melting, kneading and granulating material. A screw with only one supported end undergoes high back pressure, which necessitates a complex thrust bearing structure. The screw should be relatively long to enable granulation against the high back pressure. Therefore, the apparatus has an increased overall length and is costly to construct. The screw cannot be rotated at a high speed since if it were, the cylinder would suffer from flaws due to contact with the screw. As a result, the apparatus fails to achieve an increased processing capacity.

According to still another apparatus, a gear pump is attached to the distal end of a double-screw extruder. One disadvantage is that the double-screw extruder has no ability to adjust the degree by which the material is kneaded during operation, thus failing to achieve fine quality control dependent on the kind and nature of the resin material used. Another difficulty is that since the double-screw extruder has two cylindrical chambers communicating with each other through a lateral opening therebetween, screws disposed in the chambers are subjected to lateral forces due to the pressure of the resin material, tending to interfere with and produce flaws on the cylinder. The longer the cantilevered screws and the higher the RPM of the screws, the larger the tendency for the cylinder to suffer from such flaws. For these reasons, this apparatus has a reduced processing capability.

SUMMARY OF THE INVENTION

With the foregoing conventional difficulties of the known continuous granulating machines in view, it is an object of the present invention to provide a continuous granulating machine including a double-screw kneader capable of adjusting the degree by which a material is kneaded and a gear pump associated with the double-screw kneader, the double-screw kneader having on its distal cylinder end independent cylinder chambers which do not laterally communicate with each other, thereby eliminating the prior problems.

BRIEF DESCRIPTION OF THE DRAWINGS

The present invention will now be described with reference to FIGS. 1 through 4 of the accompanying drawings, in which:

FIG. 1 is a side elevational view, partly in cross section, of a continuous granulating machine according to the present invention;

FIG. 2 is a cross-sectional view taken along line II—II of FIG. 1;

DETAILED DESCRIPTION OF THE PREFERRED EMBODIMENTS

Figure 3:
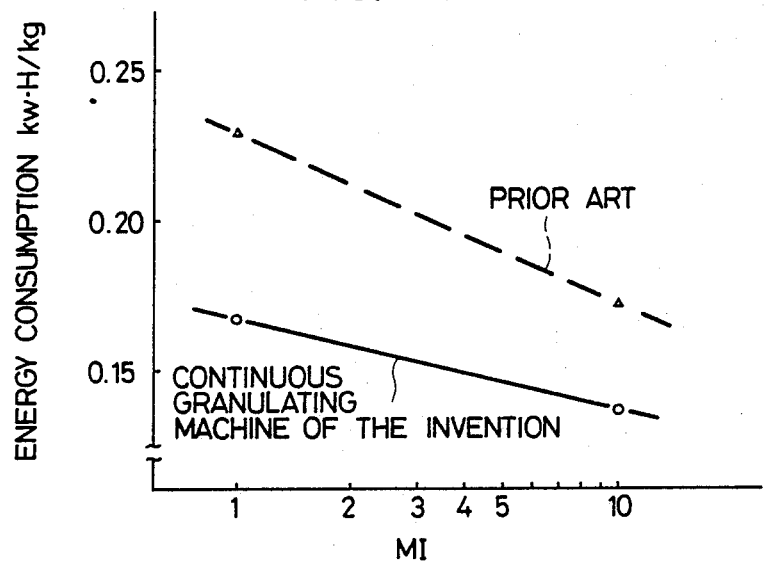
FIG. 3 is a graph showing experimental results of a comparison between the amount of energy consumed by a prior machine and that according to the present invention.

The continuous granulating machine according to the present invention comprises a double-screw kneader 1, a gear pump 2, and a cutting unit 3. The double-screw kneader has in its cylinder 4 a pair of screws 5 drivable by a motor 7 through a speed changer 6. Each of the screws 5 is composed of a rotor 5a for melting and kneading the spplied resin material, a conical slot 5b for adjusting the degree of kneading of the resin material, and a screw end portion 5c extending forwardly of the conical slot 5b. The cylinder 4 has a hopper 4a for loading the material into the kneader 1 and a conical slot 4b adjacent to the conical slot 5b. By axially displacing the cylinder 4, the clearance between the slots 4b, 5b can be adjusted. The cylinder 4 has a portion extending forwardly of the slot 4b (to the right as shown in FIG. 1) having an inside diameter smaller than that of the rear end portion of the cylinder. As shown in FIG. 2, the cylinder 4 has two independent cylinder chambers in which the screw end portions 5c are respectively disposed.

The cylinder 4 has a plurality of wheels 4e rotatably mounted on a base 8 so that the cylinder 4 can be axially moved by a hydraulic cylinder actuator 9 disposed on the base 8. The cylinder 4 has a vent 4c located forward of the slot 4b, and also includes at its distal end a pressure discharger 4d to which the gear pump 2 is connected. Between the pressure discharger 4d and the gear pump 2, there is defined a chamber 10 having a pressure sensor 11 which, upon sensing a certain pressure in the chamber 10, issues a signal to a control unit (not shown) which actuates the gear pump 2. The cutting unit 3 is positioned forwardly of the gear pump 2 and has therein a screen 20, dies 22, cutter blades and other parts (not illustrated in FIG. 1).

Figure 4A:
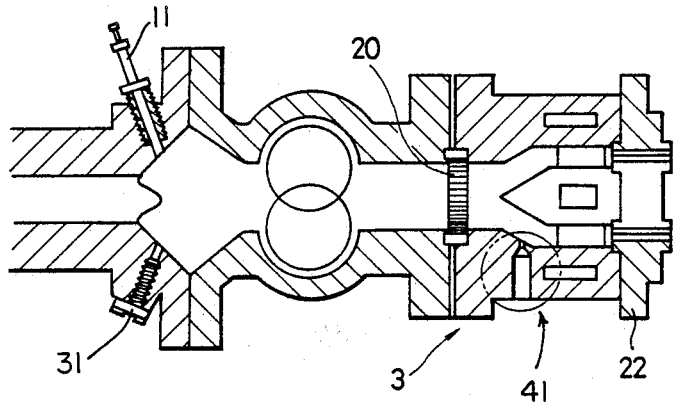
FIGS. 4a and 4b show details of a cutting unit.
Figure 4B:
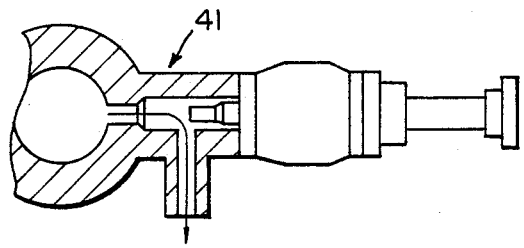

As shown in FIGS. 4a and 4b, the machine may include a discharge valve disposed in front of the gear pump (outside of the chamber 10), or the dies, or both, for discharging the melted resin material.

The purpose of installing the discharge valve 31 in front of the gear pump is to prevent unmelted masses or foreign matter from entering the gear pump and hence damaging teeth of the gear pump when the resin material is melted and kneaded by the kneader 1. When the machine starts to operate, the discharge valve 31 is held open to discharge the resin material therethrough. After it has been confirmed that the resin material is sufficiently melted and contains no foreign matter, the discharge valve 31 is switched to supply the melted resin material to the gear pump.

A discharge valve 41 may be located in front of the dies for sufficiently cleaning off the resin material between the gear pump and dies when the machine is stopped prior to the cutting operation. By initiating the cutting operation after the discharge valve 41 has been opened to completely remove the resin material from the passageway between the gear pump and the dies, the machine can produce a granulated material without yielding defective products.

The discharge valve may be provided in association with the gear pump, or the dies, or both, as desired.

The gear pump 2 and the cutting unit 3 are mounted on a wheeled base 13 so that the gear pump 2 and the cutting unit 3 will be able to follow axial movement of the cylinder 4.

The continuous granulating machine of the foregoing construction will operate as follows:

Resin material which has been introduced through the hopper 4a is delivered by the screws 5 as the material is being melted. The resin material is further melted and kneaded by the rotors 5a. The degree by which the material is kneaded is adjusted by actuating the hydraulic cylinder actuator 9 to move the cylinder 4 for varying the clearance between the slots 4b, 5b. The melted resin material, after having been kneaded to a desired degree, is fed by the screw end portions 5c to the pressure discharger 4d from which the melted resin material is supplied into the gear pump 2. While the melted resin material is being fed by the screw end portion 5c, the material is deaerated as desired by the vent 4c. The melted resin material is delivered by the gear pump 2 under a high pressure in the range of from 150 to 350 kg/cm$^2$ into the cutting unit 3 in which the material is granulated. The pressure within the chamber 10, or the pressure at the end of the pressure discharger 4d under which the melted resin material is maintained, is sensed by the pressure sensor 11. The gear pump's speed of rotation or the speed of the motor 7 is controlled by a control unit (not shown) through a feedback control loop so that the sensed pressure will fall at all times within a desired pressure range (5 to 10 kg/cm$^2$). Accordingly, the melted resin material is subjected to a low pressure ranging from 5 to 10 kg/cm$^2$ upstream of the gear pump 2 and to a high pressure ranging from 150 to 350 kg/cm$^2$ downstream of the gear pump 2.

The continuous granulating machine of the invention can freely control the degree by which the material is kneaded by adjusting the clearance between the slots while the machine is in operation. The material can thus be kneaded at a low temperature without the danger of being excessively kneaded. The kneaded material can be delivered to the cutting unit by the gear pump 2 under a high pressure, while the pressure at the pressure discharge 4d is controlled to a constant low pressure, a condition which allows the screw end portions 5c to be relatively short. The reduced pressure at the pressure discharger 4d results in a reduced force acting laterally on the screw end portions 5c. This, together with the fact that the cylinder chambers are independent of each other downstream of the slot 4b, permits the melted resin material to press the screw end portions 5c equally in all directions and hence to act as bearings for supporting the screw end portions 5c, which thus becomes less liable to engage and cause flaws on adjacent wall portions. The screws 5 can be driven to rotate at a high speed for processing a large quantity of resin material at a high rate of speed. Since the continuous granulating machine does not knead the material excessively and delivers the material under a low pressure with the relatively low pressure upstream of the gear pump, the continuous granulating machine consumes a greatly reduced amount of energy. FIG. 3 shows an experimental result indicative of a comparison between the amount of energy consumed by a conventional double-screw kneader combined with a single-screw extruder and the amount of energy consumed by the granulating machine of the invention. A study of the graph of FIG. 3 indicates that the granulating machine of the invention can reduce the required energy by about 20 to 25 %.

While in the foregoing embodiment the pressure at the pressure discharger is maintained constant by adjusting the speed of rotation of the gear pump, the pressure can also be controlled by adjusting the speed of rotation of the motor of the double-screw kneader to change the amount of supplied resin material. The inner wall surface of the cylinder may be coated with a cobalt-based or nickel-based coating for more effective prevention of damage to the cylinder by the screws. The screws can be rotated at a higher speed by selecting the flight of the screws as widely as 0.1 to 0.5 D (D: inside diameter of the cylinder).

With the present invention, as described above, the continuous granulating machine provides a double-screw kneader capable of adjusting the degree by which a material is kneaded by adjusting a clearance between slots through which the material is fed, the double-screw kneader including a cylinder having a front portion extending forwardly of the slots and having an inside diameter smaller than that of a rear portion of the cylinder, the front portion of the cylinder including independent cylinder chambers kept out of lateral mutual communication, a gear pump connected in series with a pressure discharge at the front end of the double-screw kneader, and a cutting unit mounted on an outlet of the gear pump. Such an arrangement is capable of adjusting the degree by which the material is kneaded, prevents the screws from biting into and producing flaws in the cylinder, and can extrude a large amount of material at a high speed for an increased processing capability.

What is claimed is:

1. A continuous granulating machine comprising:
a double screw kneader including a pair of cylinders each having a rear portion and a forwardly extending front portion with an end outlet and an inside diameter smaller than that of said rear portion of the cylinder and with said front portions defining independent cylinder chambers without any lateral mutual communication, a pair of screws mounted for rotation in said cylinders with each screw having a large diameter rear portion and a relatively short reduced diameter front portion disposed in one of said independent chambers, complementary conical shoulders on said cylinders and said screws between said front and rear portions respectively defining a clearance slot for controlling the passage of material from said rear portion to said front portion of each cylinder and means for axially moving said cylinders and said screws relative to each other to adjust said clearance to adjust the degree to which a material is kneaded by said kneader;
vent means in communication with the front portion of each cylinder;
a gear pump having an outlet connected to said outlet of each of said cylinders,
pressure sensor means disposed intermediate said cylinders and said gear pump and operatively connected to said gear pump to control said gear pump in response to the pressure of the material being kneaded to maintain the pressure substantially constant within the range of 5-10 Kg/cm$^2$, and
a cutting unit connected to said outlet of said gear pump.

2. A device as claimed in claim 1, said cutting unit including die means, and discharge valve means disposed in front of said die means.

3. A device as claimed in claim 2, further including discharge valve means disposed before said gear pump.

4. A device as claimed in claim 1, further including discharge valve means disposed before said gear pump.

5. A device as claimed in claim 1, further including drive means for driving said kneader and means for detecting a pressure of said material upstream of said gear pump and for regulating said drive means.

6. A continuous granulating machine comprising:
- a double screw kneader including a pair of cylinders each having a rear portion and a forwardly extending front portion with an end outlet and an inside diameter smaller than that of said rear portion of the cylinder and with said front portions defining independent cylinder chambers without any lateral mutual communication, a pair of screws mounted for rotation in said cylinders with each screw having a large diameter rear portion and a relatively short reduced diameter front portion disposed in one of said independent chambers, complementary conical shoulders on said cylinders and said screws between said front and rear portions respectively defining a clearance slot for controlling the passage of material from said rear portion to said front portion of each cylinder, and means for mounting said screws in a fixed axial position and means for moving said cylinders relative to said screws to adjust said clearance to adjust the degree to which a material is kneaded by said kneader;
- vent means in communication with the front portion of each cylinder;
- a gear pump having an outlet connected to said outlet of each of said cylinders,
- pressure sensor means disposed intermediate said cylinders and said gear pump and operatively connected to said gear pump to control said gear pump in response to the pressure of the material being kneaded to maintain the pressure substantially constant within the range of 5–10 kg/cm$^2$, and
- a cutting unit connected to said outlet of said gear pump.

7. A device as claimed in claim 6, said cutting unit including die means, and discharge valve means disposed in front of said die means.

8. A device as claimed in claim 7, further including discharge valve means disposed before said gear pump.

9. A device as claimed in claim 6, further including discharge valve means disposed before said gear pump.

10. A device as claimed in claim 6, further including drive means for driving said kneader and means for detecting a pressure of said material upstream of said gear pump and for regulating said drive means.

* * * * *